United States Patent
Hutton et al.

(10) Patent No.: US 12,353,236 B2
(45) Date of Patent: Jul. 8, 2025

(54) LARGE-SCALE ACCELERATOR SYSTEM ENERGY PERFORMANCE OPTIMIZATION

(71) Applicant: Google LLC, Mountain View, CA (US)

(72) Inventors: Michael David Hutton, Mountain View, CA (US); Georgios Konstadinidis, San Jose, CA (US); Lluis-Miquel Munguia, San Francisco, CA (US); Safeen Huda, San Jose, CA (US); Gaurav Agrawal, San Jose, CA (US)

(73) Assignee: Google LLC, Mountain View, CA (US)

( * ) Notice: Subject to any disclaimer, the term of this patent is extended or adjusted under 35 U.S.C. 154(b) by 110 days.

(21) Appl. No.: 17/968,048

(22) Filed: Oct. 18, 2022

(65) Prior Publication Data

US 2023/0119235 A1    Apr. 20, 2023

Related U.S. Application Data

(60) Provisional application No. 63/257,332, filed on Oct. 19, 2021.

(51) Int. Cl.
*G06F 1/08* (2006.01)
*G06F 11/34* (2006.01)

(52) U.S. Cl.
CPC ............ *G06F 1/08* (2013.01); *G06F 11/3495* (2013.01)

(58) Field of Classification Search
CPC .............. G06F 9/3851; G06F 9/5066; G06F 2209/5017; G06F 2209/5018; G06F 2209/5019; G06F 1/08; G06F 11/3495
See application file for complete search history.

(56) References Cited

U.S. PATENT DOCUMENTS

| | | | |
|---|---|---|---|
| 7,437,581 | B2 | 10/2008 | Grochowski et al. |
| 8,639,955 | B2 | 1/2014 | Bose et al. |
| 10,613,876 | B2 | 4/2020 | Herdrich et al. |
| 10,628,233 | B2 | 4/2020 | Xu et al. |

(Continued)

FOREIGN PATENT DOCUMENTS

WO    2018013023 A1    1/2018

OTHER PUBLICATIONS

Pagani et al. Machine Learning for Power, Energy, and Thermal Management on Multicore Processors: A Survey. IEEE Transactions on Computer-Aided Design of Integrated Circuits and Systems, IEEE, USA, vol. 39, No. 1, Jan. 1, 2020 (Jan. 1, 2020), pp. 101-116.

(Continued)

*Primary Examiner* — Aurel Prifti
(74) *Attorney, Agent, or Firm* — Lerner David LLP (57) ABSTRACT

A method and system for controlling performance of a workload partitioned among a plurality of accelerator chips of a multi-chip system. One or more processors may receive performance speed data for each of the accelerator chips, obtain a model of the partitioned workload, determine a portion of the workload that is either overworked or underworked based on the model of the partitioned workload and the performance speed data for each of the plurality of accelerator chips, and adjust a performance speed of an accelerator chip that performs the portion of the partitioned workload that is either overworked or underworked.

15 Claims, 8 Drawing Sheets

(56) References Cited

U.S. PATENT DOCUMENTS

| | | | | |
|---|---|---|---|---|
| 2007/0220293 | A1* | 9/2007 | Takase | G06F 9/30181 |
| | | | | 712/E9.035 |
| 2008/0263373 | A1* | 10/2008 | Meier | G06F 9/3851 |
| | | | | 713/300 |
| 2009/0307703 | A1* | 12/2009 | Archer | G06F 9/5094 |
| | | | | 718/104 |
| 2010/0218005 | A1* | 8/2010 | Jain | G06F 9/5094 |
| | | | | 713/300 |
| 2012/0079298 | A1* | 3/2012 | Majumdar | G06F 1/3293 |
| | | | | 713/320 |
| 2014/0047227 | A1* | 2/2014 | Breternitz | G06F 9/5066 |
| | | | | 713/2 |
| 2014/0215241 | A1 | 7/2014 | Yoon et al. | |
| 2015/0187042 | A1* | 7/2015 | Gupta | G06F 9/3851 |
| | | | | 345/501 |
| 2015/0309549 | A1* | 10/2015 | Okabe | H02J 3/0073 |
| | | | | 713/330 |
| 2015/0378419 | A1* | 12/2015 | Berghe | G06F 9/5094 |
| | | | | 713/320 |
| 2016/0132329 | A1* | 5/2016 | Gupte | G06T 1/20 |
| | | | | 718/103 |
| 2016/0188379 | A1* | 6/2016 | Rajappa | G06F 9/522 |
| | | | | 718/107 |
| 2017/0289000 | A1* | 10/2017 | Park | G06F 11/3058 |
| 2019/0187775 | A1* | 6/2019 | Rotem | G06F 1/324 |
| 2020/0133743 | A1* | 4/2020 | Baghsorkhi | G06F 17/15 |
| 2020/0412835 | A1* | 12/2020 | Xu | G06F 16/90335 |
| 2021/0192337 | A1* | 6/2021 | Loh | G06N 3/08 |
| 2021/0240247 | A1* | 8/2021 | Lobo | G06F 9/3017 |
| 2021/0247985 | A1 | 8/2021 | Venkataraman et al. | |
| 2021/0294791 | A1 | 9/2021 | Narayanaswamy et al. | |
| 2021/0312697 | A1 | 10/2021 | Maiyuran et al. | |
| 2021/0382754 | A1* | 12/2021 | Nimmagadda | G06N 3/08 |
| 2021/0390460 | A1* | 12/2021 | Nimmagadda | G06F 18/2163 |
| 2022/0113915 | A1* | 4/2022 | Ki | G06F 12/08 |
| 2022/0344049 | A1* | 10/2022 | Hall | G06F 9/5066 |
| 2022/0350669 | A1* | 11/2022 | Zhu | G06F 9/3851 |
| 2023/0037783 | A1* | 2/2023 | Huang | G06F 9/4887 |

OTHER PUBLICATIONS

International Search Report and Written Opinion for Interational Application No. PCT/US2022/046944 datd Feb. 10, 2023. 19 pages.

* cited by examiner

LARGE-SCALE ACCELERATOR SYSTEM ENERGY PERFORMANCE OPTIMIZATION

CROSS-REFERENCE TO RELATED APPLICATION

The present application claims the benefit of the filing date of U.S. Provisional Patent Application No. 63/257,332 filed Oct. 19, 2021, the disclosure of which is hereby incorporated herein by reference.

BACKGROUND

For systems using accelerator chips, performance of a workload can be improved by increasing clock frequency. One way of increasing clock frequency is to raise a voltage of the accelerator chip. However, this comes at the cost of increasing the temperature and power consumption of the chip, and potentially shortening longevity of the chip. Additionally, there are diminishing returns for increasing chip voltage, since throughput of the workload is limited not only by clock frequency but also by available memory and by interconnect speeds. Furthermore, even if throughput were linearly increased as a function of the raised clock frequency, the power consumption would increase quadratically as a function of the increased chip voltage.

In order to strike a balance in the tradeoff between increased clock frequency and increased chip voltage, dynamic voltage frequency scaling (DVFS) is typically used to dynamically adjust clock frequency through voltage changes, such that clock frequency can be high during computation-heavy periods and low during lighter periods.

However, at the single-chip level, the efficacy of DVFS is limited. The response time to establish a new voltage-frequency (V, F) set point may exceed the period of time for which the set point is needed. Additionally, in many accelerator systems, multiple accelerators are tasked to work together on a workload, meaning that increasing clock speed for one chip does not result in improved throughput when another accelerator is working slower

BRIEF SUMMARY

The present disclosure provides a solution for an improved controlling of the performance, such as clock frequency, of a workload at the single-chip level, and more specifically for controlling via DVFS for individual accelerator chips such that the efficiency of the DVFS can be improved.

One aspect of the present disclosure is directed to a method that provides for the above advantages. The method of controlling performance of a partitioned workload partitioned among a plurality of accelerator chips of a multi-chip system, comprising: receiving, by one or more processors, performance speed data for each of the plurality of accelerator chips; obtaining, by the one or more processors, a model of the partitioned workload; determining, by the one or more processors, a portion of the workload that is either overworked or underworked based on the model of the partitioned workload and the performance speed data for each of the plurality of accelerator chips; and adjusting, by the one or more processors, a performance speed of an accelerator chip that performs the portion of the partitioned workload that is either overworked or underworked.

In some examples, adjusting the performance speed of the accelerator chip may include adjusting a chip voltage of the accelerator chip. An increase in chip voltage may correspond to an increase in clock frequency of the accelerator chip.

In some examples, the method may further include: determining, by the one or more processors, a stage in lifetime of the accelerator chip; and adjusting, by the one or more processors, the chip voltage of the accelerator chip based at least in part on the determined stage in lifetime of the accelerator chip. An earlier stage in lifetime may correspond to a relatively higher chip voltage and a later stage in lifetime corresponds to a relatively lower chip voltage.

In some examples, the method may further include: receiving, by the one or more processors, power consumption data for each of the plurality of accelerator chips; and adjusting, by the one or more processors, the performance speed of the accelerator chip based further on the power consumption data.

In some examples, the method may further include determining, by the one or more processors, an available surplus of provisioned power for the multi-chip system. Adjusting the performance speed of the accelerator chip may include supplying at least some of the available surplus of provisioned power to the accelerator chip.

In some examples, adjusting the performance speed of the accelerator chip may include diverting power from one accelerator chip of the plurality of accelerator chips to another accelerator chip of the plurality of accelerator chips.

In some examples, the method may further include: detecting, by the one or more processors, a burst period during which a tail latency of the multi-chip system is higher than predetermined target tail latency of the multi-chip system; and during the detected burst period, increasing, by the one or more processors, the performance speed of one or more of the plurality of accelerator chips, whereby increasing the performance speed results in a reduction of tail latency of the multi-chip system to or below the predetermined target tail latency.

In some examples, the method may further include: receiving, by the one or more processors, traffic history indicating traffic to accelerator chips of the multi-chip system; predicting from the received traffic history, by the one or more processors, a burst period during which a predicted tail latency of the multi-chip system will be higher than a predetermined target tail latency of the multi-chip system; and during the predicted burst period, increasing, by the one or more processors, the performance speed of one or more of the plurality of accelerator chips, whereby increasing the performance speed results in a reduction of the predicted tail latency of the multi-chip system to or below the predetermined target tail latency.

In some examples, the method may further include: for one or more overworked accelerator chips, adjusting the performance speed of the one or more overworked accelerator chips until the tail latency is less than or equal to the predetermined tail latency target.

In some examples, the method may further include: identifying, by the one or more processors, one or more high-compute portions of the partitioned workload; and determining, by the one or more processors, two or more of the plurality of accelerator chips that perform the one or more high-compute portions of the partitioned workload; and scheduling, by the one or more processors, the performance speed of the two or more accelerator chips to increase and decrease in a round-robin fashion.

In some examples, the partitioned workload may be partitioned in parallel among the plurality of accelerator chips, and the method may further include: determining, by the one or more processors, a synchronization point in performance of the partitioned workload; and adjusting, by the one or more processors, a performance speed of each of the plurality of accelerator chips to reach the synchronization point at a common time based on the performance speed data for each of the plurality of accelerator chips.

In some examples, the partitioned workload may be a machine learning training model comprising one or more embedding layers. Embedding tables of each embedding layer may be distributed among the plurality of accelerator chips, and the synchronization point may be completion of a training step of the machine learning training model.

In some examples, receiving performance speed data, determining the synchronization point, and adjusting performance speed may be repeatedly performed by the one or more processors in a continuous feedback loop.

Another aspect of the present disclosure is directed to an apparatus that provides for the above advantages. The apparatus for controlling performance of workloads in a multi-chip system, comprising: a plurality of accelerator chips included in the multi-chip system; a plurality of host processors, each host processor configured to control a dynamic voltage and frequency scaling (DVFS) set point for performance of one or more workloads among a respective subset of the plurality of accelerator chips; and a master controller configured to: monitor operations of the plurality of host processors; determine available unused power for the multi-chip system based on the monitored operations of the plurality of host processors; and control distribution of the available unused power to each of the respective subset of the plurality of accelerator chips.

In some examples, the master controller may be configured to: for each accelerator chip, monitor one or more properties of the accelerator chip, the one or more properties including at least one of a temperature, an amount of power consumption, an amount of occupancy, an amount of time at a high voltage status, or an amount of utilization of the accelerator chip; and for each subset of the plurality of accelerator chips: determine an amount of available slack of the subset based on the monitored one or more properties of the accelerator chips included in the subset; and instruct the host processor of the subset to adjust the DVFS set point based on the determined amount of available slack.

In some examples, the multi-chip system may include one or more racks. Each rack may include a plurality of trays. Each tray may include a plurality of accelerator chips. Each host processor may be configured to control the DVFS set point of the accelerator chips at a respective tray of the multi-chip system, and the master controller may be configured to monitor operations of the plurality of host processors for a respective rack of the multi-chip system.

In some examples, the multi-chip system may be a high-performance computing system, including but not limited to a machine learning inference system.

Yet another aspect of the present disclosure is directed to an apparatus for controlling performance of a workload partitioned between a plurality of workers, the apparatus comprising: the plurality of accelerator chips of a multi-chip system, wherein each worker of the workload is associated with a different respective accelerator chip; and a controller including one or more processors configured to: receive, from each worker, a step time indicating an amount of time taken by the worker to reach a predetermined checkpoint in the workload; compare the step times received from each of the workers; and adjust a dynamic voltage and frequency scaling (DVFS) set point for each accelerator chip associated with the plurality of workers to reduce a difference between the step times of the plurality of workers.

In some examples, the multi-chip system may be a machine learning training system for training a machine learning model. The predetermined checkpoint may be a training step of the machine learning training system. Additionally or alternatively, an embedding layer of the machine learning model may be distributed among the plurality of workers.

DETAILED DESCRIPTION

Overview

Example systems and methods for controlling the performance of a workload at the single-chip level, and more specifically for controlling via DVFS for individual accelerator chips, is described herein. The systems and methods are applicable to workloads that are divided or partitioned among multiple accelerator chips of a multi-chip system, and takes advantage of disparities in the runtime for each accelerator chip performing its assigned portion of the partitioned workload. For instance, a workload may be partitioned such that a first accelerator chip in a pipeline finishes its tasks slower than a second accelerator chip in the pipeline, leaving the second accelerator chip waiting for the first accelerator chip to finish on a regular or constant basis. In such an example, it may be advantageous to increase the clock speed of the first accelerator chip, decrease the clock speed of the second accelerator chip, or both.

Control of chip-level performance speed may be implemented by one or more controllers that may control clock speed of the accelerator chips performing the partitioned portions of the workload. The controllers may monitor various properties of the accelerator chips, such as their temperature, power consumed, occupancy, and utilization, among other metrics. This information can be used to determine whether increasing or decreasing clock speed of any of the accelerator chips would result in an overall increase in efficiency for the individual accelerator chip, for the system as a whole, or both.

Improved efficiency may be accomplished in any one or combination of ways. In some cases, improved efficiency may be achieved by reaching a predetermined tradeoff point between clock speed and power consumption. Additionally or alternatively, improved efficiency may be achieved by increasing throughput without increasing power, such as by redistributing power among the accelerator chips to decrease overall tail latency of the system. Additionally or alternatively, improved efficiency may be achieved based on utilization of surplus power in the system, either from an inefficiently utilized accelerator chip or from provisioned power at a power domain of the system. Overall efficiency of the system may be characterized or quantified in terms of a ratio between throughput and cost, whereby any one or combination of power consumption, accelerator chip longevity, and system size may factor into the cost.

The principles of the present disclosure may be applied to various types of partitioned workloads, including but not limited to machine learning systems, high-performance computing systems, video processing or other compute-intensive workloads.

One example partitioned machine learning system is an inference system, in which multiple machine learning models may be arranged in series, in parallel, or some combination thereof in order to complete a complex task. For instance, text extraction from photos or videos may involve a text recognition model pipelined with a text processing model. In such a case, the text processing may be faster than the text recognition, whereby efficiency may be increased by lowering a clock speed of the accelerator chips handling text recognition, raising a clock speed of the accelerator chips handling text processing, or some combination thereof.

Another example partitioned machine learning system is a training system, in which embeddings of the training system are distributed among multiple accelerator chips working in parallel. Due to the nature of embeddings, they are inherently difficult to evenly partition and may have unequal access patterns, meaning that some accelerator chips may complete operations faster than other accelerator chips. One or more controllers may continuously monitor the time taken by each accelerator chip to complete the portion of the workload partitioned to it, and adjust the DVFS set point of one or more accelerator chips to reduce a difference in completion time for each of the accelerator chips.

The methods and systems of the present disclosure can improve system performance for partitioned workloads, in terms of any one or combination of increasing throughput, decreasing tail latency for inference systems and training time for training systems, and increasing the Perf/TCO. This can have advantageous effects on the cost of operating the system, due to any one or combination of reduced time for completing operations, reduced power consumption, fewer effects of aging from system components due to more efficient use of the components, and so on.

Example Systems

Figure 1:
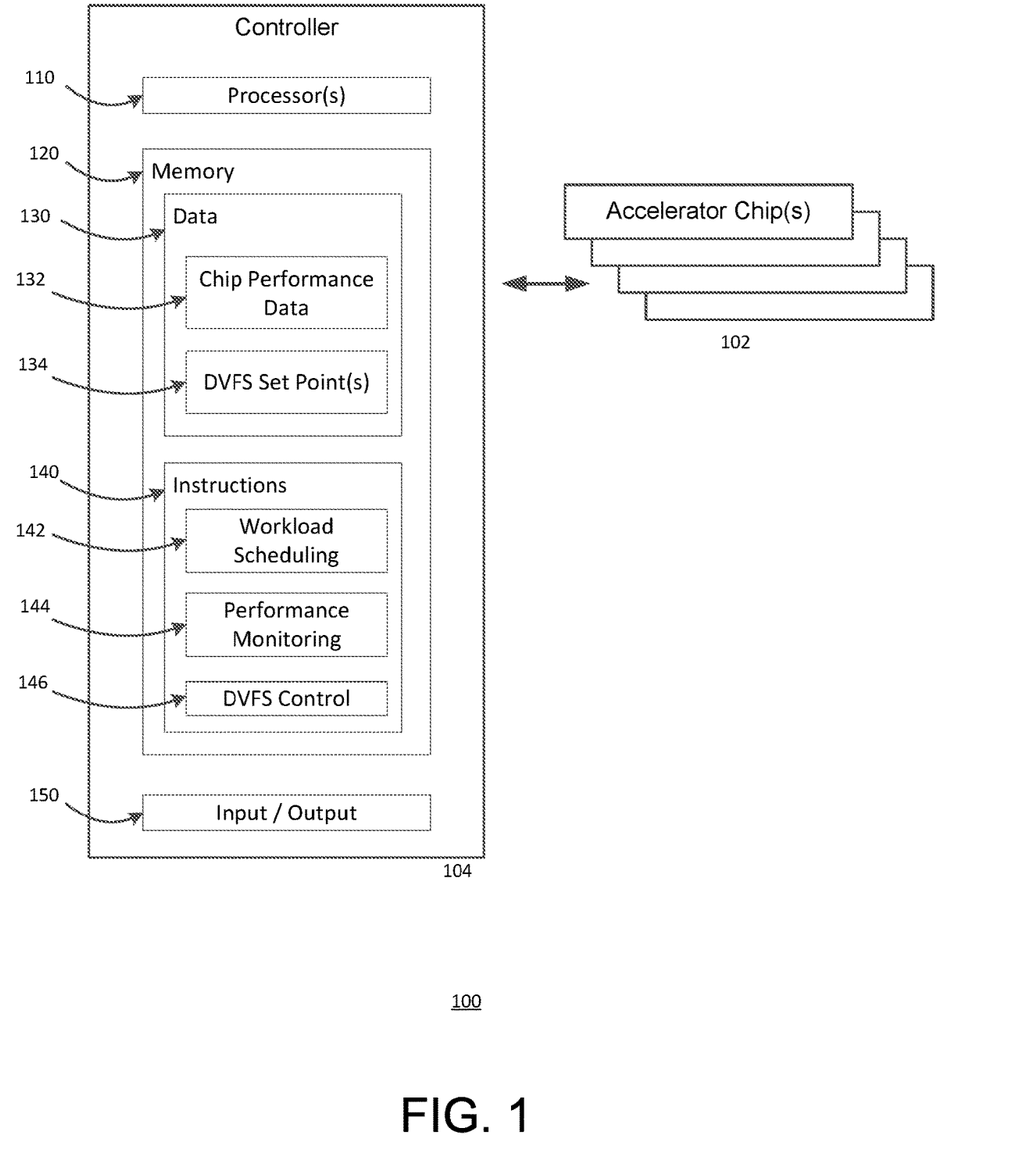
FIG. 1 is a block diagram illustrating an example system according to aspects of the disclosure.

FIG. 1 is a block diagram of an example compute-acceleration system 100 including multiple accelerator chips 102 and one or more computing devices 104 for controlling operation of the accelerator chips 102.

The accelerator chips 102 may include any one or combination of field-programmable gate array (FPGA) units, smart network interface cards (NICs), network processors, tenser processor units (TPUs), graphics processing units (GPUs), machine-learning accelerators, networking accelerators, supercomputer clusters, and other known types of accelerators, as well as proprietary accelerators.

The one or more computing devices 104 may include a processor 110, memory 120 and input/output components 150 for receiving and transmitting data with other components included in the system 100, including but not limited to the accelerator chips 102. The accelerator chips 102 may be communicatively connected to one another as well as to the one or more computing devices 104.

The processor 110 can include a well-known processor or other lesser-known types of processors. Alternatively, the processor 110 can include a dedicated controller such as an ASIC.

The memory 120 may be a type of non-transitory computer readable medium capable of storing information accessible by the processor 110 such as a hard-drive, solid state drive, tape drive, optical storage, memory card, ROM, RAM, DVD, CD-ROM, write-capable, and read-only memories. For instance, the memory 120 can store data 130 that can be retrieved, manipulated or stored by the processor 110, instructions 140 that can be executed by the processor 110, or a combination thereof.

Although the system and method is not limited by a particular data structure, the data 130 can be stored in computer registers, in a data store as a structure having a plurality of different fields and records, or documents, or buffers. The data 130 can also be formatted in a computer-readable format such as, but not limited to, binary values, ASCII or Unicode. Moreover, the data 130 can include information sufficient to identify relevant information, such as numbers, descriptive text, proprietary codes, pointers, references to data stored in other memories, including other network locations, or information that is used by a function to calculate relevant data.

For example, in FIG. 1, the data 130 is shown to include chip performance data 132 indicating performance statistics of the individual accelerator chips 102, and one or more DVFS set points indicating an operating setpoint for each of the individual accelerator chips 102. The performance statistics may be determined using known techniques based on analysis of the chip conducted by the system, information received from the chip, or both, and may indicate such properties as power consumed, throughput and latency of the current or past workloads running on the chip. Typically, latency may be expressed in terms of an amount of time to derive a result in response to a received query. In the case of a machine learning system supported by the accelerator chips 102, the latency may be expressed in terms of an amount of time to train the machine learning system, and is typically expressed for individual training steps. The operating setpoint may further indicate one or both of a voltage at which the chip is operating and a clock frequency at which the chip is operating. Typically, changes in operating voltage for a chip correspond to changes in operating frequency. For instance, increasing the operating voltage setpoint of the chip will typically increase frequency, which can potentially improve throughput and latency, but at the cost of more power consumed. Conversely, decreasing the operating voltage setpoint of the chip will typically decrease frequency, which can potentially improve power consumption but at the cost of lower throughput and latency.

The instructions 140 can be a set of instructions executed directly, such as machine code, or indirectly, such as scripts, by the processor 110. In this regard, the terms "instructions," "steps" and "programs" can be used interchangeably herein. The instructions 140 can be stored in object code format for direct processing by the processor 110, or other types of computer language including scripts or collections of independent source code modules that are interpreted on demand or compiled in advance.

For example, in FIG. 1, the instructions 140 are shown to include a workload scheduling routine 142 for scheduling workloads between the individual accelerator chips 102 of the system 100, a performance monitoring routine 144 for obtaining the chip performance data 132, and a DVFS control routine 146 for controlling and setting the DVFS setpoints 134 for each of the accelerator chips 102. These and other routines are described in greater detail herein in connection with FIGS. 6-8.

The communication device 150 may facilitate communication between the one or more computing devices 104 and other remote devices that are in communication therewith. The remote devices may include the accelerator chips 102, one or more other computing devices or controllers included in the system 100, one or more user devices in communication with the controller, or any combination thereof. Communication between the components of the system 100 or with external components may be facilitated via a wired or wireless network connection, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

Although FIG. 1 functionally illustrates the components of the one or more computing devices 104, such as the processor 110 and corresponding memory 120, as being included within a single block, these components may actually include multiple devices, such as multiple processors and memories, that may or may not be stored within the same physical housing. For example, some of the data and instructions can be stored on a removable CD-ROM and others within a read-only computer chip. Some or all of the instructions and data can be stored in a location physically remote from, yet still accessible by, the processor. Similarly, the processor can actually include a collection of processors, which may or may not operate in parallel.

The plurality of accelerator chips 102 shown in FIG. 1 may be tasked with performing one or more workloads. Each chip may be equipped with its own hardware for managing a performance speed at the chip. For instance, each chip may include DVFS circuitry for setting a voltage/frequency setpoint of the chip in response to instructions received from a controller, such as the one or more computing devices 104. The chips 102 may further include an on-chip switchover mechanism such as a frequency locked loop (FLL) or clock multiplexer (MUX) in order to facilitate changes in clock frequency at the chip.

Ideally, it would be desirable to divide processing and memory requirements for workloads evenly between the accelerator chips. If this were possible, each chip could in general operate at a common voltage/frequency setpoint in coordination with each of the other chips. However, this is often not possible, and the unevenness of workload division between accelerator chips creates inefficiencies in chip performance for one or more of the accelerator chips.

Figure 2:
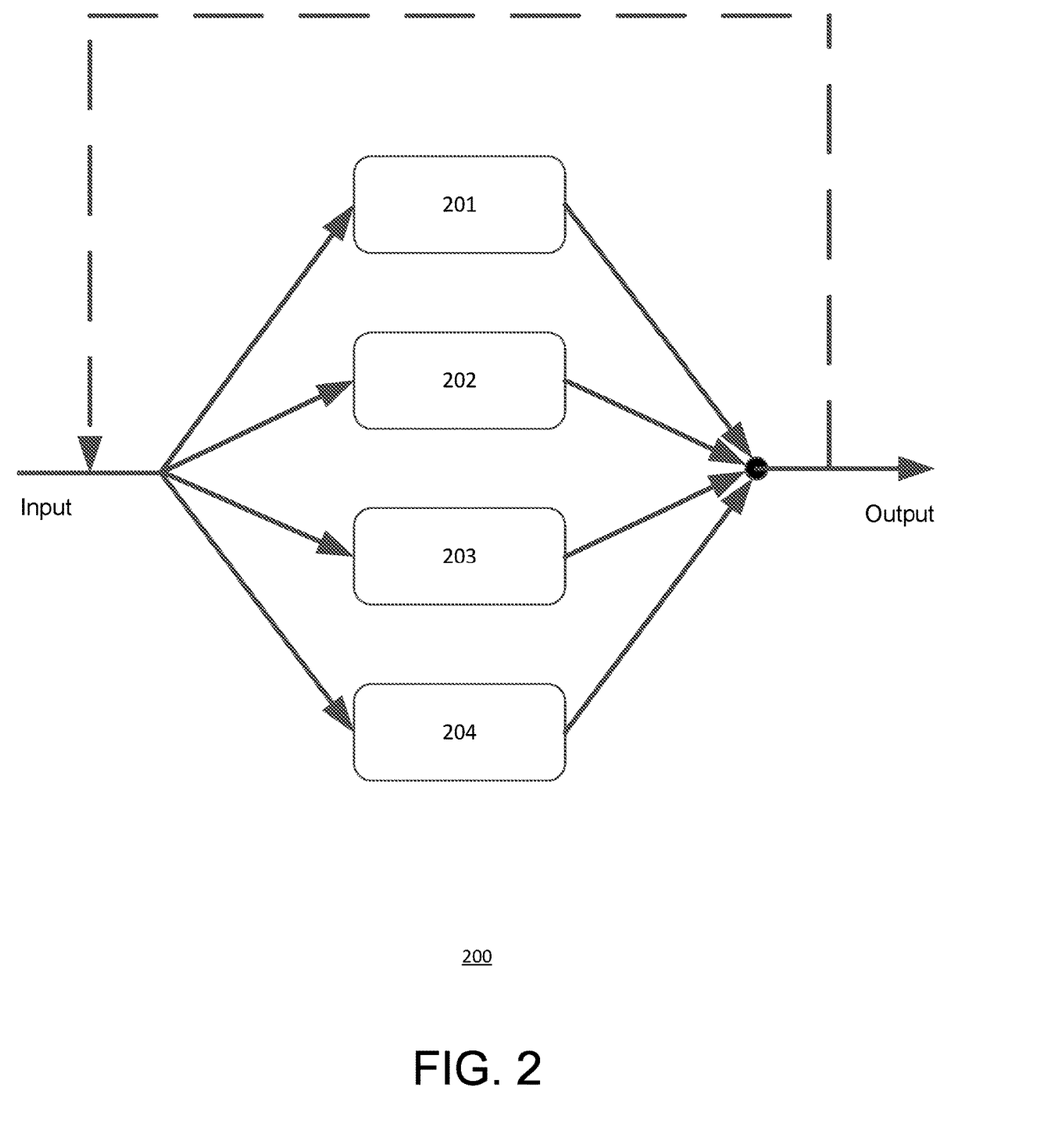
FIGS. 2 and 3 are example data flow diagrams according to aspects of the disclosure.
Figure 3:
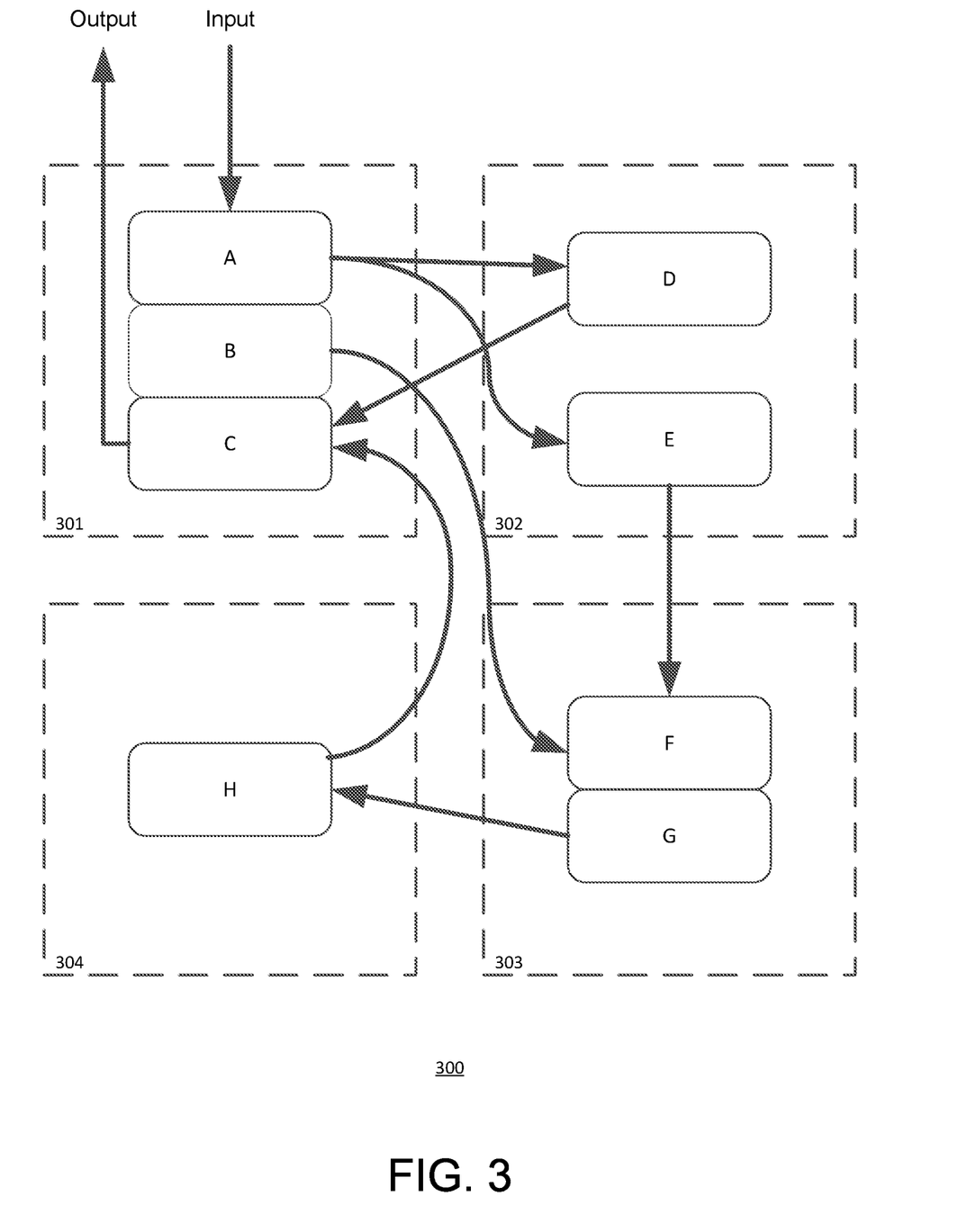

For the sake of example, FIGS. 2 and 3 illustrate respective workload data flows for two example accelerator chip arrangements in order to illustrate the presence inefficiencies in chip performance that arise from dividing the workload. In the example of FIG. 2, a training workload is illustrated, and in the example of FIG. 3, an inference machine learning workload is illustrated. However, it should be understood the same or similar principles may be applied to other machine learning workloads, and to other workloads in general.

In FIG. 2, the training machine learning workload involves providing an input, such as training data, to a training system 200 including a plurality of accelerator chips 201-204. Each of the chips 201-204 computes a portion of the training data, and outputs from each of the chips 201-204 may be combined to produce an overall training output of the system 200. For instance, in the case of a neural network, the training output may include updated weights associated with nodes of the network. The output may influence operations during future iterations of the training system 200, as shown by the dashed arrow connecting the output end of the system 200 to its input end.

In the example of FIG. 2, the training system 200 is data-parallel, meaning that each of the respective accelerator chips is tasked to perform its work in parallel with the other chips. For a machine learning model operating on a data batch having size B, the batch may be divided among k workers, whereby each worker may correspond to one or more chips, such that during a forward pass of the training process, each worker operates on a mini-batch having size B/k. The workers may then exchange gradients with one another, for instance using an AllReduce operation, and then each worker may individually update parameters of the machine learning model during a backward pass of the training process. While in some cases this may allow for workers to operate fully in parallel such that each worker is expected to finish at approximately the same time, in practice this is not the case. This is at least in part because the data needed by several of the workers can be separately stored with each worker due to its size, meaning that each worker stored a portion of the available data, and the workers must query each other for data. Since it is hard to predict what data will be needed more or less often by more or fewer workers, this leads to suboptimal partitioning of the data and imbalance in the time spent querying data, which in turn results in some workers completing its tasks faster than other workers.

For example, many neural networks include an embedding layer followed by a fully-connected or dense layer. For instance, this may be found in neural networks including collaborative filtering or deep factorization, and may be typically of certain machine learning applications such as recommendation system applications. Embedding tables for the embedded layers are distributed among the multiple workers, resulting in the aforementioned imbalance in compute times for the workers.

In FIG. 3, the inference machine learning workload involves providing an input, such as a query, to a plurality of accelerator chips 301-304 for executing the query and providing an output, which may be an answer or response to the query. Unlike the example of FIG. 2, the workload of FIG. 3 involves each chip performing a different portion of the workload in sequence with the other chips of the system, instead of performing roughly the same task in parallel, often referred to as pipelined model parallelism. Data flow to, between and from the chips 301-304 may be controlled by a scheduling program, such as the workload scheduling routine 142 shown in FIG. 1. The program may further be capable of processing the received queries, determining an appropriate workflow for each respective queries, and then directing the query to its corresponding appropriate workflow. In some cases, this may involve choosing between different machine learning models. For example, a search engine workflow may choose between multiple search models, or a translation workflow may choose between multiple language-pairs. Additionally or alternatively, if there are replicas of the same machine learning model, this may involve choosing one of the model replicas for handling the query. Furthermore, some queries may be directed to multiple models in sequence. For example, an optical character recognition (OCR) module may utilize a text extraction model for extracting text from images or video, followed by a text processing model for processing the extracted text. In other examples, chips 301-304 may execute different complete versions of the same model with different latencies.

In the example of FIG. 3, all workloads are shown to begin at chip 301. However, depending on a type of chosen machine learning model chosen by the scheduler, flow of the inputted query may differ. For instance, some workflows may be routed from chip 301 to chip 302 for processing by task D, and then returned to chip 301 as an input to task C before being output from chip 301. Other workflows may be routed from chip 301 to both chips 302 and 303 for processing at tasks E, F and G as shown in FIG. 3, with an output of tasks G being input to chip 304 for further processing at task H before being provided back as an input to task C at chip 301 and finally output as the result of the query. The differing workflows result in unevenly partitioning portions of the workloads between the various chips 301-304, which in turn results in imbalance between power and frequency needs of each of the chips 301-304. Thus, some chips may be more latency-constrained than others.

The imbalances presented by the systems of FIGS. 2 and 3 present an opportunity for the computing devices 104 of the system 100 to improve an overall efficiency of the accelerator chips 102 by redistributing power between the chips. This may involve receiving performance speed data for each of the chips, determining which chips are overworked or underworked based on the performance speed information, and adjusting the performance speed of one or more chips depending on whether those chips are determined to be overworked or underworked. For instance, if one chip is found to have a greater amount of slack or idle time than another chip, then the chip with more slack or idle time may be adjusted to operate at a lower voltage and lower frequency, the chip with less slack or idle time may be adjusted to operate at a higher voltage and lower frequency, or both.

In some cases, a voltage/frequency setpoint may be decreased at one chip without affecting an overall latency of the system. For example, if the chip is determined to be underworked and regularly idle, then slowing performance at the chip may not decrease latency of the overall system. Thus, less power may be consumed without affecting throughput.

In other cases, a voltage/frequency setpoint may be increased at one chip and decreased at another chip to improve overall latency of the system but without affecting overall power consumption. For example, if one chip is found to be overworked while another chip is found to be underworked, diverting power from the underworked chip to the overworked chip may help to ensure that both chips complete their respective tasks at the same time if operating in parallel, or to smooth out inefficiencies and backlogs in a pipelined workflow if operating in series. Thus, throughput may be improved while maintaining or decreasing power consumption levels. Alternatively, throughput may be greatly improved while only slightly increasing power consumption levels. Stated more generally, voltage/frequency setpoints of the accelerator chips may be adjusted to increase an overall performance-to-cost ratio of the system.

In some instances, the adjustment of voltage/frequency setpoints may be further informed by knowledge of the workload and how it is partitioned among the accelerator chips. For instance, in some cases, increasing the voltage/frequency setpoint of an accelerator chip may not produce any improvement in throughput, even if the chip is overworked. This may be the case if, for example, the overworked chip is part of a workflow pipeline and an upstream worker of the workflow is also overworked but cannot be sped up. Then, speeding up the downstream chip would simply result in idle time but there would be no additional data flowing into the chip in order to improve throughput. One typical instance of this scenario may be found in an image model that is limited by image decoding upstream, such that increasing voltage/frequency setpoints for image processing downstream may not lead to any increase in throughput. In this and similar cases, the computing device's knowledge of the workload and how it is partitioned can prevent resources from being diverted to the downstream overworked chip, thus maintaining power consumption savings and a relatively better performance-to-cost ratio.

Additionally or alternatively, the adjustment of voltage/frequency setpoints may be informed by knowledge of a virtual health status of the accelerator chips. Long term reliability of a semiconductor circuit is a function of the percentage time the chip spent at high voltage. Over the course of operation of a chip, the amount of time the chip spends at high voltage can be tracked, and the virtual health status for the chip can be determined. This data can be tracked for each chip individually by the chip's respective controller. The health status can be used on a chip-by-chip basis to determine which chips are in healthier status and which are not, and to preferentially choose voltage increases to those chips which are in the healthier status. The virtual health status information may also be used to determine when the system as a whole has become unhealthy, for instance due to too many chips having spent their allotted time in the high voltage state. Knowledge of the system as a whole being too unhealthy may be used to initiate a warning to schedule replacement of worn-out chips in advance of failure. Additionally or alternatively, knowledge of the system as a whole being too unhealthy may be used to initiate a re-balancing of the system to retain tail latency goals, such as by incorporating more workers into the system.

Additionally or alternatively, the adjustment of voltage/frequency setpoints may be informed by knowledge of a stage in lifetime of the accelerator chips. It is generally expected that performance of the chip will improve over the course of its lifetime, largely due to improvements in the models that are executed using the chip. Therefore, in order to achieve the same level of performance across the lifetime of the chip, relatively more power is required early in the lifetime of the chip and less power later in the lifetime of the chip. This knowledge can be used to provision more power to the chip during an early stage of lifetime and provision less power to the chip during a later stage of lifetime. Furthermore, in the case of a system having a group of accelerator chips of the same age or stage of lifetime, the same strategy may be employed for the entire system in order to maximize throughput of the system for the system's entire lifetime. In other words, when the system is relatively new, more power can be provided in order to maximize productivity at the cost of product lifetime. Then, when the system is older, less power can be provided to maximize longevity of the system but with little or no tradeoff for productivity since the models run on the system have improved over time.

Additionally or alternatively, the adjustment of voltage/frequency setpoints may be based on power consumption data of the accelerator chips. In some instances, power consumption may be evaluated in order to even out power consumption among the chips, such as by diverting power from one chip to another chip, without increasing an overall power consumption of the system. In other instances, the computing devices may determine that there is a surplus of provisioned power available in the system, and thus may increase power consumption of one or more or even all of the accelerator chips without having to decrease or at least commensurately decrease power consumption at other chips of the system. Conversely, if it is determined that overall power in the system is too high, such as the system failing to meet a power provisioning requirement, then power consumption of one or more or even all of the accelerator chips may be decreased, such as by permanently decreasing voltage/frequency setpoints, temporarily throttling the voltage/frequency setpoints, or a combination of the two.

Surplus power may be determined by measuring a total power available to the system and comparing the total power available to predetermined maximum and minimum thresholds. Power available in excess of the maximum threshold may be repurposed for increasing voltage/frequency setpoints of the chips in the system. Conversely, a minimum threshold higher than the power available may prompt decreasing voltage/frequency setpoints of the chips in the system.

The power consumption data may further include an indication of a maximum power for each individual chip, whereby the computing devices may avoid increasing voltage/frequency setpoints of the chips to a level that would exceed the maximum power rating of any chip. Maximum power ratings may include an absolute maximum power value, such that the power at the chip does not exceed the absolute maximum power value even temporarily. Additionally or alternatively, maximum power ratings may indicate a maximum amount of time for which power may be sustained at a high power level, whereby the chip does not exceed the maximum amount of time at the high power level. Other maximum power ratings generally known in the art may be implemented and enforced. In some instances, such as when chips are handling high-compute workloads that demand high voltage to handle the workloads, the computing devices may spread out increases in voltage/frequency to the chips by scheduling temporary increases among the chips in a round-robin fashion to avoid excess backlogs at any of the chips during the high-compute workloads.

Within those systems of the present disclosure having parallel-portioned workloads, such as the training machine learning system of FIG. 2, another way of adjusting voltage/frequency setpoints may involve determining a synchronization point in the performance of the parallel-partitioned workload, and adjusting a performance speed of each of the chips to reach the synchronization point at a common time. The synchronization point may be a point in the workflow at which all of the chips are expected to have completed about an amount of the workload. In the example of a training system, this may be a single iteration or step of the training algorithm, such as when the parameters of the trained model are updated. If some chips complete the iteration before other chips, then the frequency of the faster chips may be decreased, the frequency of the slower chips may be increased or both. Adjustments to the chips may be performed repeatedly, such as by using a continuous feedback loop, whereby each iteration or step of the training algorithm corresponds to a circuit of the feedback loop.

Additionally, within some of the systems of the present disclosure, such as the inference machine learning system of FIG. 3, another way of adjusting voltage/frequency setpoints may be based on a tail-latency of the accelerator chips in the system. The tail-latency is typically an amount of time and further characterized as a percentage, which indicates the percentage of a sample set of queries that are completed within the amount of time. For instance, a P95 tail-latency of 11 ms indicates that 95% of queries are completed within 11 ms or less, while 5% of queries take 11 ms or longer. Tail-latencies may be monitored for various percentiles, including but not limited to P50, P90, P95 and P99. Each monitored tail-latency may be associated with a predetermined target value. For instance, if the P95 tail-latency is monitored as having a predetermined target value of 12 ms, then the measured 11 ms would indicate that the overall multi-chip system is performing adequately. Conversely, if the predetermined target value were 9 ms, then the measured 11 ms tail-latency would indicate that the system is underperforming at the P95 scale. Similar measurements and evaluations may be made at P50, P90 and P99, or other predetermined percentages.

Tail-latency varies with the distribution of queries over time, and may be affected by the amount of slack built into the system in order to absorb bursts of traffic. Optimizing for tail-latency typically introduces idleness into the system for the purpose of absorbing the bursts of traffic.

The system of the present disclosure can further improve tail-latency optimizations by adjusting voltage/frequency setpoints of one or more accelerator chips during burst times. For instance, some or all accelerator chips may receive increased voltage during burst times in order to increase idleness in the system, and may receive decreased voltage during more idle times in order to reduce power and duty-cycle when extra idleness is not needed. Additionally, monitoring performance of the individual accelerator chips can indicate which of the chips would most benefit from the increase in idleness, would be harmed the least by a decrease in idleness, or a combination of the two, in order to best absorb the bursts of traffic and decrease the tail-latency of the overall multi-chip system. A further feature of tail-latency optimization provided by the present disclosure is the ability to determine an optimal tradeoff point between increasing voltage/frequency setpoints and reducing tail-latency.

Figure 4:
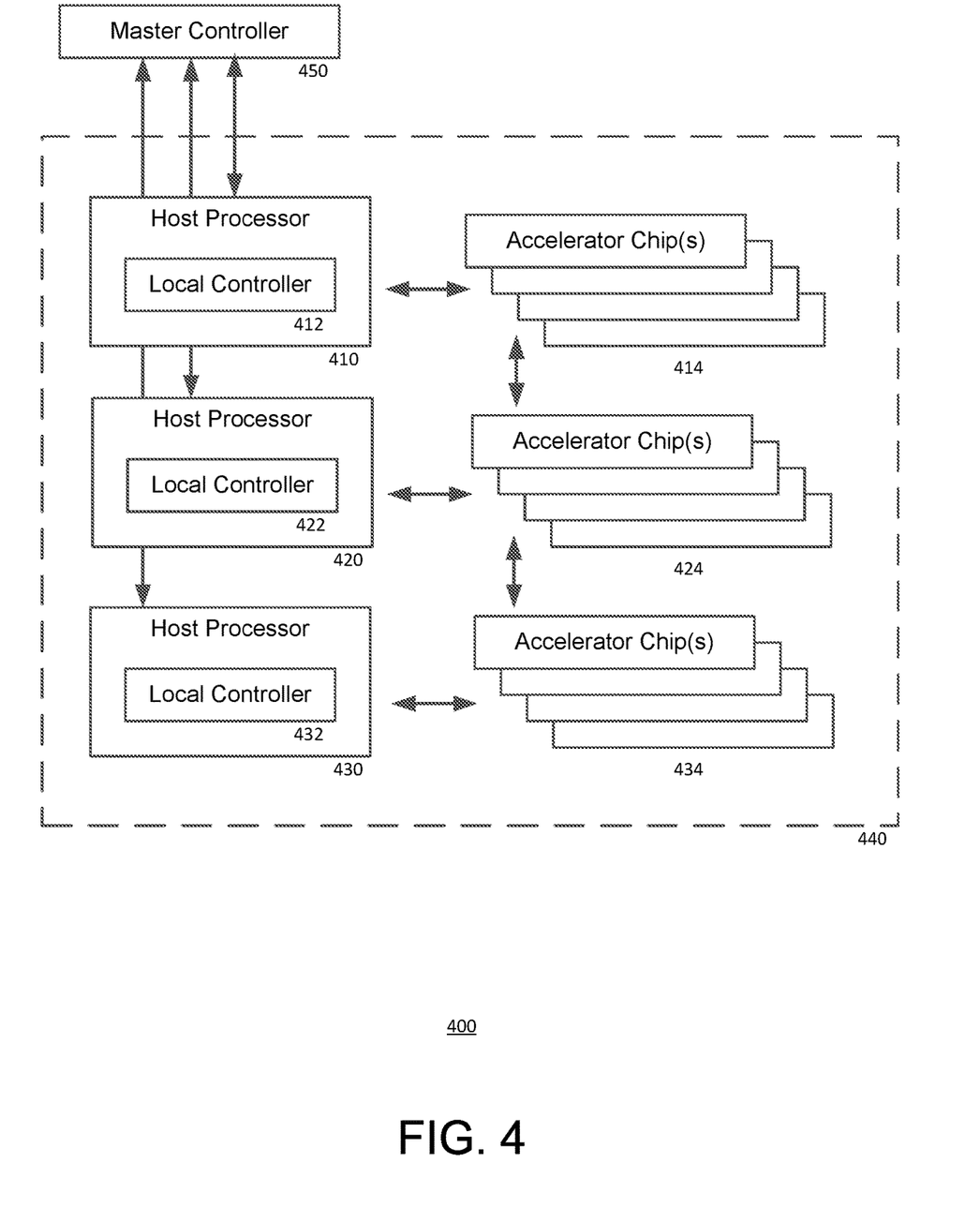
FIG. 4 is a block diagram illustrating another example system according to aspects of the disclosure.

The above examples generally describe a single controller for centrally controlling a plurality of accelerator chips, and particularly for controlling performance of the plurality of accelerator chips, such as by controlling voltage/frequency setpoints of the chips. However, in other instances, additional control circuitry may be included in the system in order to provide broader control over the system. For example, FIG. 4 illustrates an example system 400 including a plurality of host processors 410, 420, 430, each configured to operate as a respective local controller 412, 422, 432 for a corresponding one or more accelerator chips 414, 424, 434. The host processors 410, 420, 430 and chips 414, 424, 434 may constitute a collection 440 of processing elements having a level of granularity larger than the system 100 illustrated in FIG. 1. The accelerator chips 414, 424, 434, may be communicatively connected to one another in addition to the connections to the host processors 410, 420, 430. A master controller 450 may be provided for communicating with and controlling decisions by each of the local controllers 412, 422, 432 of the host processors 410, 420, 430 of the collection 440. An example master controller is described in greater detail in connection with FIG. 5.

In one example, a single host processor and its corresponding chips controlled by the host processor may amount to the level of granularity of a tray of accelerator chips, such that the host processor is a controller for the tray, while the collection 440 may be a rack comprising multiple trays of accelerator chips. Thus, in such an example, the rack may include host trays and accelerator trays in some proportion, such as 1:1 or 1:2. The master controller 450 may be a control circuit for the entire rack. In another example, the collection 440 may be a larger power domain including multiple racks, such as an entire power-plane, and the host processors may represent tray controllers. Thus, in such an example, the master controller 450 may be a control circuit for the entire power domain.

Figure 5:
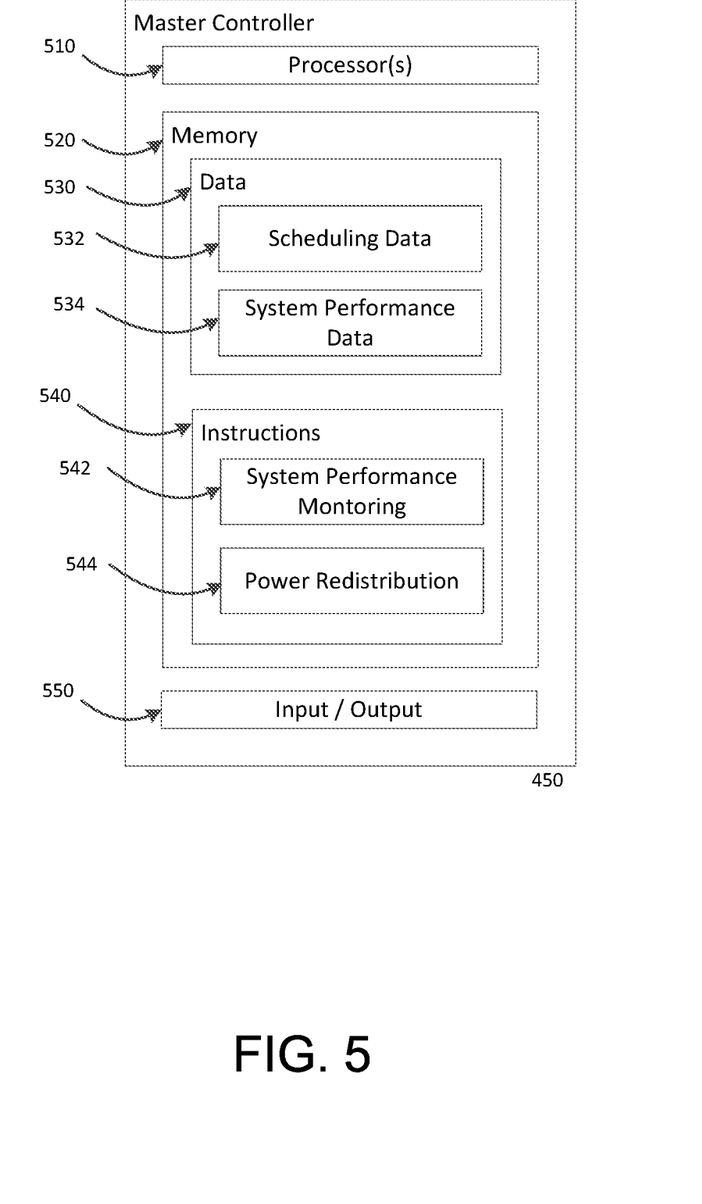
FIG. 5 is a block diagram of a master controller of the system of FIG. 4.

As shown in the block diagram of FIG. 5, the master controller 450 may include one or more processors 510, memory 520 for storing data 530 and instructions 540, and a communication interface 550 for receiving inputs and transmitting outputs. The components of the master controller 450 may be fully or partially by one or more chips of the system 100. Additionally or alternatively, the components of the master controller 450 may include any one or combination of a central processing unit (CPU), register-transfer level (RTL) blocks, or may be the same as or similar to any components of the embodiments of the computing devices 104 described in connection with FIG. 1. In any given embodiment, it should be understood that the respective arrangements of the local controllers 412, 422, 432 may differ from one another, and further may differ from that of the master controller 450.

The data 530 of the master controller 450 may include scheduling data 532 obtained from collection 440. The scheduling data may include, but is not limited to, information indicating a temperature of the individual chips of the collection 440, power consumption of the individual chips of the collection 440, as well as occupancy and utilization statistics of the individual chips of the collection 440. The data 530 may further include system performance data 534 indicating overall statistics for the collection, such as overall temperature, power consumption, occupancy and utilization within the collection.

The instructions 540 of master controller 450 may include a system performance monitoring routine 542 for processing the collected data 532, 534. Such processing may involve computing an available slack, such as for determining whether to collectively adjust DVFS setpoints for chips within the collection. For instance, the master controller may determine to divert some power from one tray to another tray or from one rack to another rack, in order to better balance and optimize the system 400. The processing may further involve determining power consumption relative to a threshold value, such as for determining whether to divert power from one or more trays or racks of the collection 440 to be provisioned, or vice versa. Lastly, the instructions 440 may include a power redistribution routine 444 for communicating the aforementioned decisions to the local controllers 412, 422, 432 of the host processors 410, 420, 430. In some examples, the master controller 450 may make decisions at the rack or power-domain level, while the host processors 410, 420, 430 may still be responsible for making determinations for the individual chips at the tray level. In other examples, decision making may be made entirely by the master controller 450, and the local controllers 412, 422, 432 may be responsible only for executing instructions received from the master controller 450.

Example Methods

The routines executed by one or both of the local and master controllers, as well as other routines, are described in greater detail in connection with the diagrams of FIGS. 6-8. It should be understood that the routines described herein are merely examples, and in other examples, certain steps may be added, subtracted, replaced or reordered.

Figure 6:
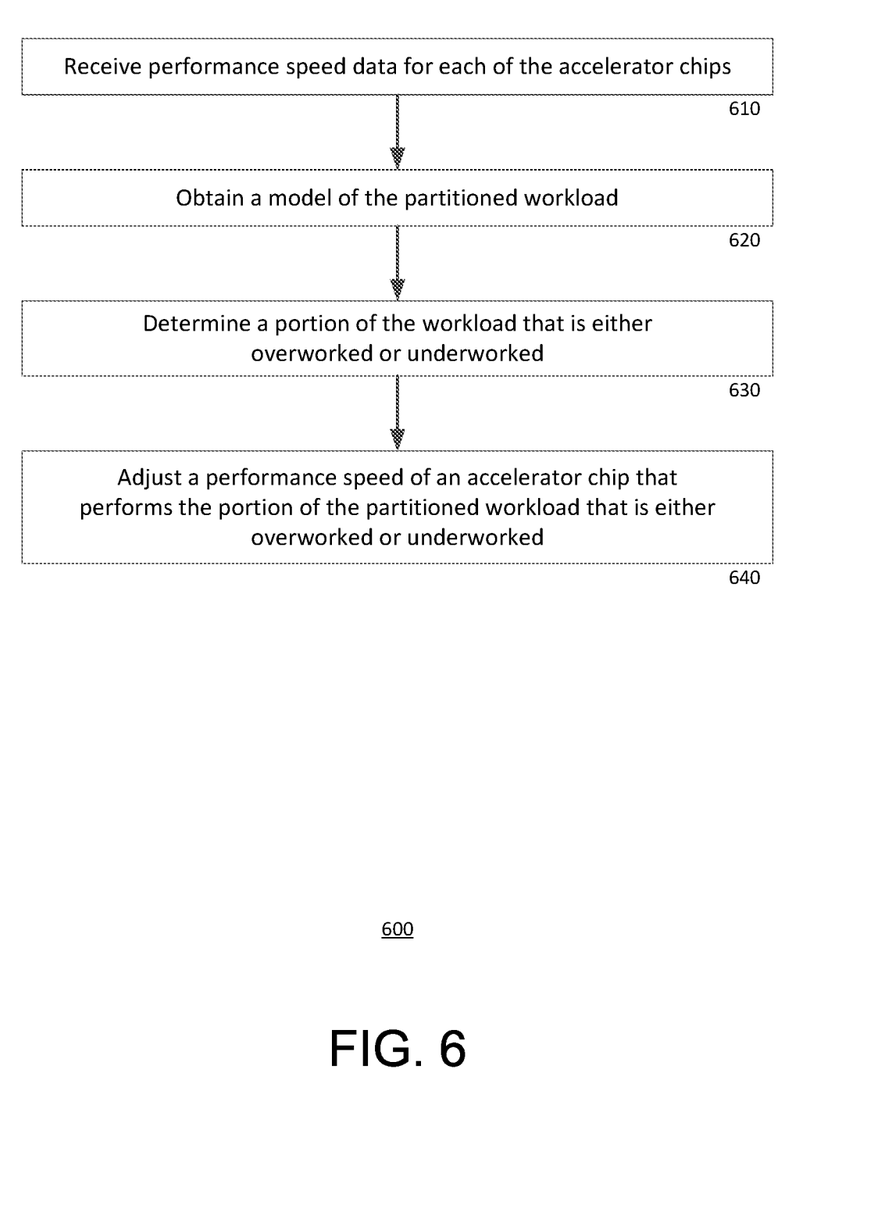
FIG. 6 is a flow diagram of an example routine according to aspects of the disclosure.

FIG. 6 is a flow diagram illustrating an example routine 600 for controlling performance of a partitioned workload partitioned among a plurality of accelerator chips of a multi-chip system. As noted herein, the routines may be performed exclusively by a local controller, or by a combination of master and local controllers. Additionally, in some embodiments, master and local controllers may split local and collective decision-making responsibilities, while in other embodiments, the master controller may be responsible for all decision-making and may simply relay instructions to the accelerator chips via the processors of the local controllers.

At block 610, one or more processors receive performance speed data for each of the accelerator chips of the multi-chip system. The performance speed data may indicate a setting of each accelerator chip, such as its voltage/ frequency setpoint, its temperature, an amount of current, an amount of power consumption, an amount of slack, and so on.

At block 620, the one or more processors obtain a model of the partitioned workload. The model may provide additional information as to the relationship between accelerator chips of the system, such as which ones of the chips receive data from other ones of the chips, or whether the chips are in a parallel configuration.

At block 630, the one or more processors determine a portion of the workload that is either overworked or underworked. In some examples, this may involve identifying latency-constrained portions of the workload. Additionally or alternatively, this may involve analyzing a throughput for individual accelerator chips of the system. High latency or low throughput may be indicative of a portion of the workload handled by a given accelerator chip being overworked. Conversely, low latency or high throughput may be indicative of a portion of the workload handled by a given accelerator chip being underworked. Additionally or alternatively, this may involve analyzing power provided to individual accelerator chips of the system to determine whether any of the accelerator chips are being overworked due to excess power being provided to those chips.

At block 640, the one or more processors adjust a performance speed of the one or more accelerator chips that perform the portion of the partitioned workload that is either overworked or underworked. Overworked chips may be adjusted to increase a DVFS setpoint, whereby the voltage and clock frequency of the chip is increased in order to handle incoming tasks with increased efficiency. Underworked chips may be adjusted to decrease the DVFS setpoint, whereby the voltage and clock frequency of the chip is decreased in order to reduce power consumption at the chip at the cost of decreased efficiency. By increasing efficiency at overworked chips while decreasing efficiency at underworked chips, the overall efficiency of the system may be increased. This increased efficiency may be realized in one or more ways, including decreased power consumption, increased throughput, decreased latency, an increased performance-to-cost ratio, improved longevity of the system, or any combination thereof.

The routine 600 of FIG. 6 may be implanted differently depending on the particular arrangement of the accelerator chips within the system. For instance, a system having a pipelined workload may require different control techniques than a system having a parallel-partitioned workload.

Figure 7:
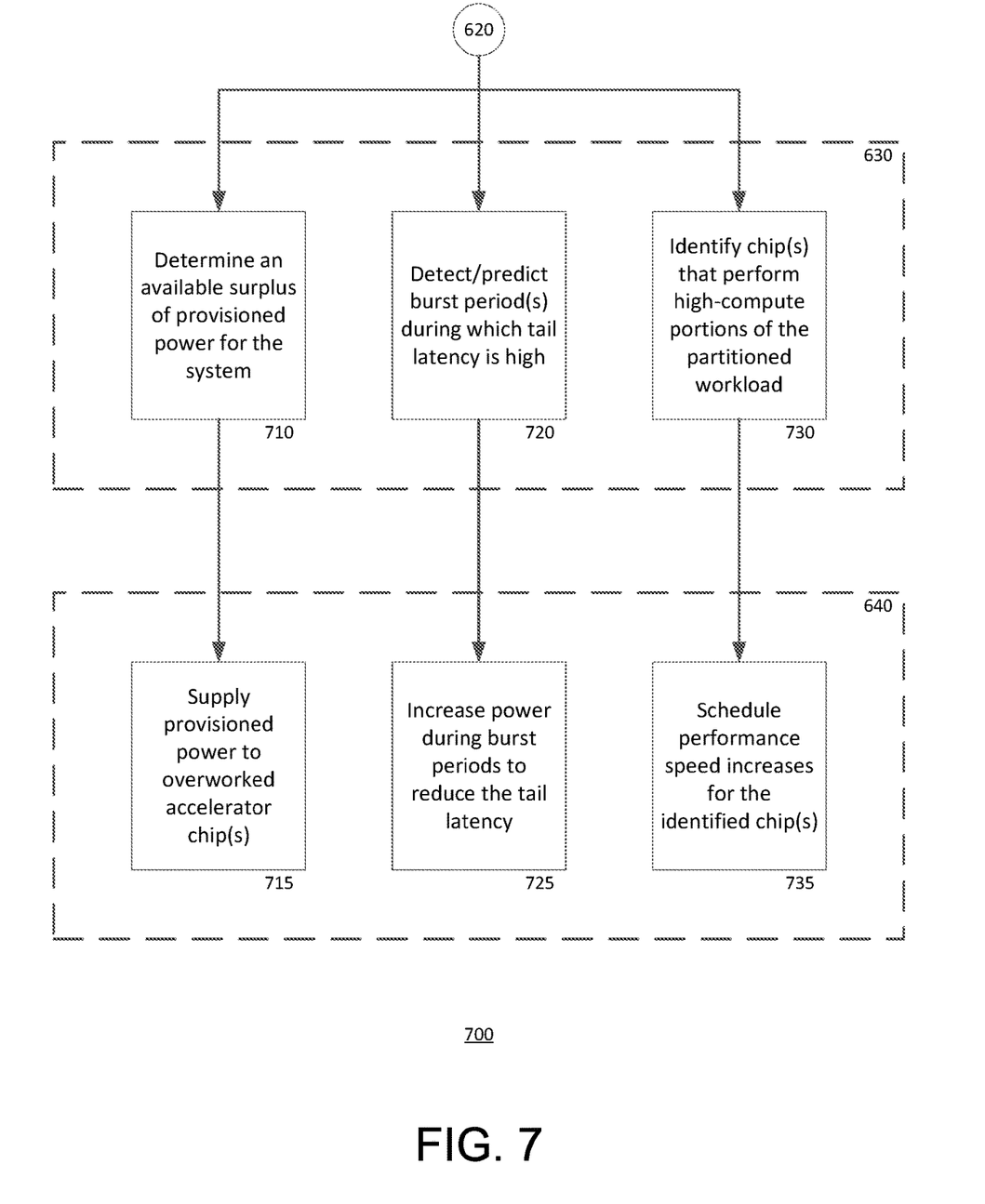
FIGS. 7 and 8 are flow diagrams of example subroutines of the routine of FIG. 6.

FIG. 7 is a flow diagram of an example subroutine 700 for controlling performance of a pipelined workload. Each of blocks 710, 720 and 730 of the subroutine 700 represent examples of analyses or determinations that may be performed at block 630 of the routine 600 of FIG. 6. Each of blocks 715, 725 and 735 of the subroutine represent examples of control operations that may be performed at block 640 of the routine 600 of FIG. 6 in response to the determinations of blocks 710, 720 and 730, respectively.

At block 710, the one or more processors determine an available surplus of provisioned power for the system. If there is excess power to be provisioned, then at block 715, the one or more processors may supply the excess provisioned power to one or more accelerator chips of the system. In particular, the power may be supplied to overworked ones of the accelerator chips in order to improve an efficiency of those chips and avoid the chips being overworked relative to the other chips of the system.

At block 720, the one or more processors determine a burst period during which tail latency is high. In response, at block 725, the one or more processors control one or more of the accelerator chips to increase power during the burst period. The increased power may be concentrated at the most overworked accelerator chips, since these chips predominantly contribute to the tail-latency of the system, and increasing slack at those chips will most efficiently reduce the tail-latency of the system. This has the effect of reducing overall tail-latency of the system due to the added slack in the workflow afforded by the increased efficiency of the accelerator chips with added power.

In some examples of block 720, determining the burst period may involve detecting an increase in traffic. In the case of an inference machine learning system, the increase in traffic may be an increase in incoming queries for the system to handle. In response to the increased traffic, power may be increased at one or more, or even all, of the accelerator chips at block 725.

In other examples of block 720, determining the burst period may involve predicting when an increase in the traffic will occur. The prediction may be based on past traffic patterns, which may be collected, stored and analyzed by the one or more processors. Then, based on the analysis of past traffic, the one or more processors may preemptively increase power at the most overworked accelerator chips in order to absorb the incoming increase in traffic.

At block 730, the one or more processors identify one or more accelerator chips that perform high-compute portions of the partitioned workload. Since the high-compute portions of the workload are more susceptible to affecting tail-latency of the system, and since the accelerator chips performing the high-compute portions generally are the most overworked chips of the system, at block 735, the one or more processors schedule performance increases for the chips identified at block 730. The performance increases may involve increases to the voltage/frequency setpoints of the identified chips, either permanently or temporarily. In the case of temporary increases to voltage/frequency setpoints, these increases may be cycled through the identified accelerator chips, such as in a round-robin fashion, in order to provide relief to each of the potentially overworked portions the workload while also avoiding provisioning too much power to the system as a whole.

Figure 8:
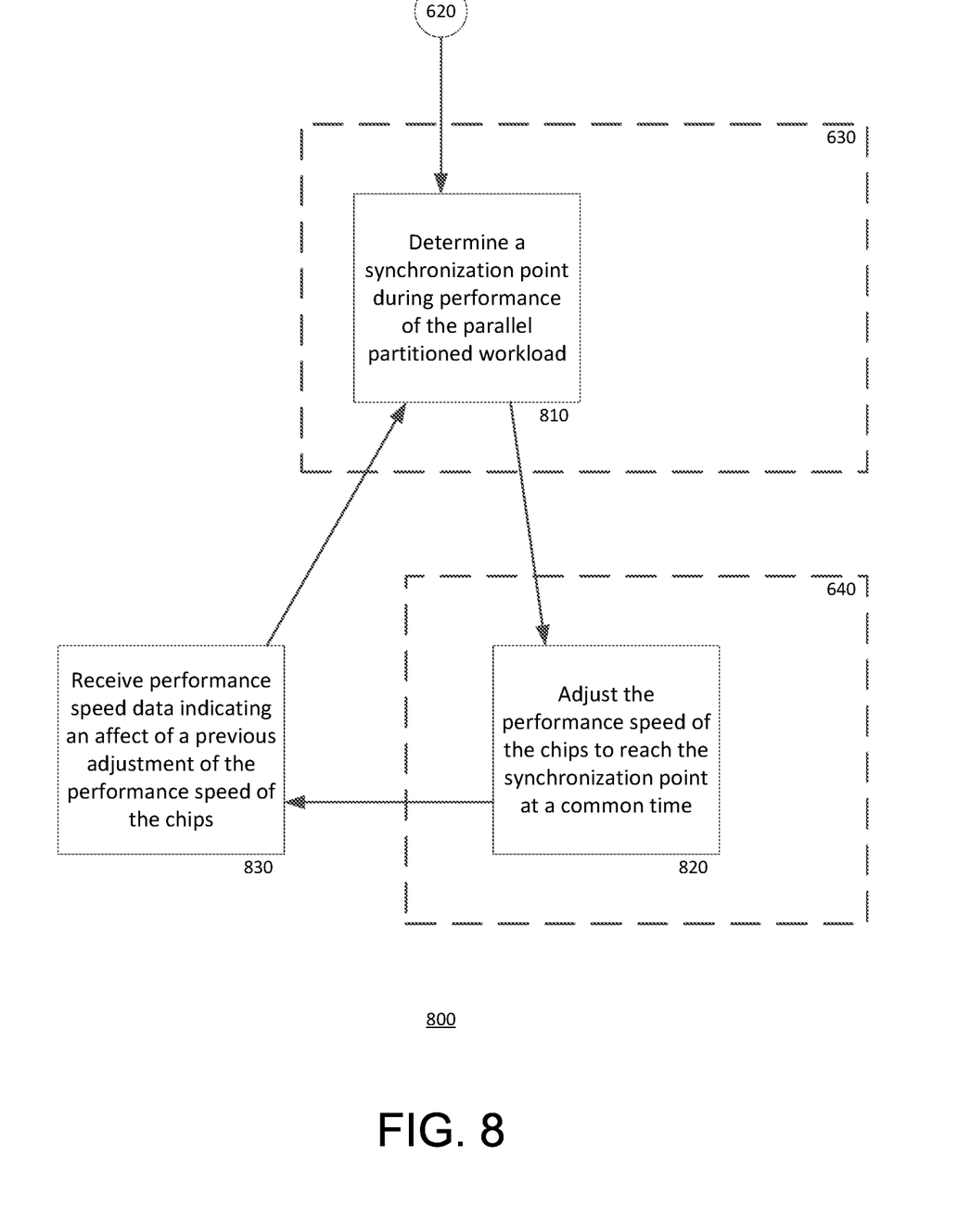

FIG. 8 is a flow diagram of an example subroutine 800 for controlling performance of a parallel-partitioned workload. Block 810 of the subroutine 800 represents an example of an analysis or determination that may be performed at block 630 of the routine 600 of FIG. 6, and block 820 of the subroutine represents an example of control operations that may be performed at block 640 of the routine 600 of FIG. 6 in response to the determinations at block 810.

At block 810, the one or more processors determine a synchronization point during performance of the parallel-partitioned workload. The synchronization point may indicate a milestone in the parallel-partitioned workload, such as a complete iteration or step of a training algorithm. Then, at block 820, in response to detection of the synchronization point, the one or more processors may adjust the performance speed of the accelerator chips. The adjustment may be based on which of the chips took longest to complete the previous one or more iterations, such as by timing a completion time of the previous iteration or a running average of a predetermined number of iterations. Chips that take longer to complete previous iterations may be adjusted to perform future iterations faster, chips that take shorter to complete previous iterations may be adjusted to perform future iterations longer, or both. These adjustments may be accomplished by repeatedly collecting performance speed data for each of the chips, as shown at block 830, and adjusting as necessary in order to further improve performance. The performance speed data may indicate an effect of previous adjustments of the performance speed of the chips. In general, performance may be considered improved when a time between a first chip finishing its portion of the workload and a last chip finishing its portion of the workload is reduced. Conversely, increases in the difference in time between finished workload portions may indicate a worsening in performance, necessitating an adjustment to the clock frequency of one or more of the accelerator chips.

The blocks 810-830 of FIG. 8 may be cycled in order to provide a continuous feedback loop, and so that the performance speed of each accelerator chip is continuously being adjusted. In the case of parallel-partitioned workloads, certain partitions may be expected to perform more work than other partitions due to the imbalance, and the overworked partitions remain relatively consistent in the short term. However, over the long term, the partitions that are overworked may change. Thus, the continuous feedback loop provides a good way to smoothly transition DFVS or other power consumption settings of the accelerator chips over the course of an iterative training or other machine learning-based optimization workflow.

Although block 830 of FIG. 8 is shown as occurring after block 820 and before block 810, it should be understood that the information obtained at block 830 may be continuously gathered, such as simultaneously with other blocks or between block 810 and block 820.

The above examples generally describe techniques and solutions for achieving dynamic power-performance tradeoffs with improved efficiency. The improved efficiency may be realized in the form of faster processing, reduced power costs, or a combination of the two. More generally, the improved efficiency can be an increase in a performance-to-cost ratio (Perf/TCO) of the system. The improved Perf/TCO may result in reduced tail-latency for inference machine learning systems, reduced training time for training machine learning systems, and over time may prevent unwanted effects from aging system components.

The above examples generally describe controlling performance of a plurality of accelerator chips using DVFS set points. However, it should be understood that alternative and additional forms of performance control may be implemented by the computing devices of the present disclosure using the same or similar underlying principles. For example, another way of controlling power consumption, throughput and latency without changing a DVFS setpoint is to throttle the priority of an application's access to resources, such as external memory or input from a connected processor. Further ways of controlling power consumption at an individual chip include clock throttling, changing assigned priorities to the chip in a scheduling component of the system, disabling one or more compute units of a chip, and so on. Clock throttling may refer to either reduced clock frequency at a same voltage level, or to cycle skipping, and can be triggering in response to sensed properties at the accelerator chip, such as electrical current, power consumption, temperature diversions, or any combination thereof. These and other techniques can be used in conjunction with DVFS, or instead of DVFS entirely.

Additionally, the above examples generally describe control at one or two levels of hierarchy of a system. However, it should be understood that performance control may be implemented by the computing devices of the present disclosure at any number of levels of granularity of the system hierarchy using the same or similar underlying principles. For instance, each level may include its own respective controller or controllers that may analyze aspects of the lower hierarchies, and report to controllers at higher hierarchies. Similarly, controllers at the higher hierarchies may send control signals for controlling the individual chips through multiple hierarchical layers of controllers.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling performance of a partitioned workload partitioned among a plurality of accelerator chips of a multi-chip system, the method comprising:
   receiving, by one or more processors, performance speed data for each of the plurality of accelerator chips;
   obtaining, by the one or more processors, a model of the partitioned workload, wherein the partitioned workload comprises a plurality of tasks, wherein different tasks of the plurality of tasks are performed by different accelerator chips of the plurality of accelerator chips, and wherein the model indicates a flow of data between the tasks and which tasks are performed by which accelerator chips;
   determining, by the one or more processors, one or more of the accelerator chips included in the plurality of accelerator chips that are either overworked or underworked based on the model of the partitioned workload and the performance speed data for each of the plurality of accelerator chips; and
   adjusting, by the one or more processors, performance speeds of the determined one or more accelerator chips that are either overworked or underworked.

2. The method of claim 1, wherein adjusting the performance speed of an accelerator chip of the determined one or more accelerator chips comprises adjusting a chip voltage of the accelerator chip, wherein an increase in chip voltage corresponds to an increase in clock frequency of the accelerator chip.

3. The method of claim 2, further comprising:
   determining, by the one or more processors, a stage in lifetime of the accelerator chip; and
   adjusting, by the one or more processors, the chip voltage of the accelerator chip based at least in part on the determined stage in lifetime of the accelerator chip, wherein an earlier stage in lifetime corresponds to a relatively higher chip voltage and a later stage in lifetime corresponds to a relatively lower chip voltage.

4. The method of claim 1, further comprising:
   receiving, by the one or more processors, power consumption data for each of the plurality of accelerator chips; and
   adjusting, by the one or more processors, the performance speeds of the one or more accelerator chips based further on the power consumption data.

5. The method of claim 4, further comprising determining, by the one or more processors, an available surplus of provisioned power for the multi-chip system,
   wherein adjusting the performance speeds of the one or more accelerator chips comprises supplying at least some of the available surplus of provisioned power to at least one accelerator chip.

6. The method of claim 4, wherein adjusting the performance speed of the accelerator chip comprises diverting power from at least one accelerator chip of the plurality of accelerator chips to another accelerator chip of the plurality of accelerator chips.

7. The method of claim 4, further comprising:
   detecting, by the one or more processors, a burst period during which a tail latency of the multi-chip system is higher than a predetermined target tail latency of the multi-chip system; and
   during the detected burst period, increasing, by the one or more processors, the performance speed of one or more of the plurality of accelerator chips, whereby increasing the performance speed results in a reduction of tail latency of the multi-chip system to or below the predetermined target tail latency.

8. The method of claim 4, further comprising:
   receiving, by the one or more processors, traffic history indicating traffic to accelerator chips of the multi-chip system;
   predicting from the received traffic history, by the one or more processors, a burst period during which a predicted tail latency of the multi-chip system will be higher than a predetermined target tail latency of the multi-chip system; and
   during the predicted burst period, increasing, by the one or more processors, the performance speed of one or more of the plurality of accelerator chips, whereby increasing the performance speed results in a reduction of the predicted tail latency of the multi-chip system to or below the predetermined target tail latency.

9. The method of claim 7, further comprising:
for one or more overworked accelerator chips, adjusting the performance speed of the one or more overworked accelerator chips until the tail latency is less than or equal to the predetermined tail latency target.

10. The method of claim 4, further comprising:
identifying, by the one or more processors, one or more high-compute portions of the partitioned workload; and
determining, by the one or more processors, two or more of the plurality of accelerator chips that perform the one or more high-compute portions of the partitioned workload; and
scheduling, by the one or more processors, the performance speed of the two or more accelerator chips to increase and decrease in a round-robin fashion.

11. The method of claim 1, wherein the partitioned workload is partitioned in parallel among the plurality of accelerator chips, the method further comprising:
determining, by the one or more processors, a synchronization point in performance of the partitioned workload; and
adjusting, by the one or more processors, a performance speed of each of the plurality of accelerator chips to reach the synchronization point at a common time based on the performance speed data for each of the plurality of accelerator chips.

12. The method of claim 11, wherein the partitioned workload is a machine learning training model comprising one or more embedding layers, wherein embedding tables of each embedding layer are distributed among the plurality of accelerator chips, and wherein the synchronization point is completion of a training step of the machine learning training model.

13. The method of 12, wherein receiving performance speed data, determining the synchronization point, and adjusting performance speed are repeatedly performed by the one or more processors in a continuous feedback loop.

14. The method of claim 1, wherein the model of the partitioned workload is obtained from a workload scheduler that controls the data flow between the plurality of accelerator chips.

15. The method of claim 1, further comprising determining whether or not changing performance of one accelerator chip will affect performance of other accelerator chips to which data from said one accelerator chip flows, wherein determining one or more of the accelerator chips included in the plurality of accelerator chips that are either overworked or underworked is based on the determination of whether or not changing performance of the one accelerator chip will affect performance of the other accelerator chips.

* * * * *